United States Patent [19]

Hangai et al.

[11] Patent Number: 5,079,755
[45] Date of Patent: Jan. 7, 1992

[54] APPARATUS FOR DETECTING A DEVIATION OF A READING POSITION FOR USE IN A DISC PLAYER

[75] Inventors: Toshimasa Hangai; Koichi Ishitoya, both of Tokorozawa, Japan

[73] Assignee: Pioneer Electronic Corporation, Tokyo, Japan

[21] Appl. No.: 417,193

[22] Filed: Oct. 4, 1989

[30] Foreign Application Priority Data

Feb. 21, 1989 [JP] Japan .................................. 1-41420

[51] Int. Cl.$^5$ .............................................. G11B 7/00
[52] U.S. Cl. .............................. 369/44.11; 369/44.25; 369/33; 369/43
[58] Field of Search ................. 369/44.32, 32, 33, 43, 369/44.11, 44.12, 44.13, 44.25, 44.26, 44.27, 44.29, 44.28, 47, 61, 50, 48, 49, 44.31, 44.33, 44.34; 358/342; 250/201.5

[56] References Cited

U.S. PATENT DOCUMENTS

| 4,498,159 | 2/1985 | Daimon | 369/44.38 |
| 4,748,610 | 5/1988 | Nakata et al. | 369/44.32 |
| 5,001,334 | 3/1991 | Ikeda | 369/44.41 |

Primary Examiner—Robert L. Richardson
Assistant Examiner—Thai Tran
Attorney, Agent, or Firm—Fleit, Jacobson, Cohn, Price, Holman & Stern

[57] ABSTRACT

An apparatus for detecting a deviation of reading position for use in a disc player. A detection signal of the deviation of reading position is generated if a sync signal to be extracted from the read-out signal is not yielded for a predetermined time period under the presence of a lock detection signal which is produced when the focus servo system is in a locking condition. Owing to this structure, the deviation of the information reading light spot from a proper position is surely detected without enlarging the scale of circuits in the disc player.

3 Claims, 3 Drawing Sheets

APPARATUS FOR DETECTING A DEVIATION OF A READING POSITION FOR USE IN A DISC PLAYER

BACKGROUND OF THE INVENTION

1. Field of the Invention

The present invention relates to an apparatus for detecting the deviation of a reading position of a disc player such as a video disc player or a digital audio disc player.

2. Description of Background Information

Optical disc players are structured such that an optical light beam is used to trace a recording track of a disc which is constituted by depressions called "pits" formed in the recording surface of the disc, and a recording signal is read-out by detecting the light from the recording surface of the disc. For such operations, it is necessary to use various servo systems, namely, a focus servo system for converging the light beam onto the surface of the disc to form a light spot for reading information (information reading point), a tracking servo system for moving the information reading point so that it follows the recording track accurately, and a spindle servo system for controlling a relative speed of the information reading point with respect to the recording disc.

As the focus servo system, systems according to a so-called astigmatic method are known, in which the light beam is converged, by using a cylindrical lens for example, as a focal line in horizontal direction at one of two points on the light path of the light beam which are apart from each other, and at the same time converged as a focal line in vertical direction at the other of the two points, and a light sensor of a quadrant type is disposed at a middle position of the two points, to generate an error signal.

On the other hand, as the tracking servo system, systems according to a so-called three-beam method is known, in which three beams including a main beam for reading information and two sub beams for detecting tracking errors disposed on both sides of the main beam are prepared, and arranged in such a manner that a line passing centers of the three beams forms a predetermined off-set angle with respect to the direction of the track, and an error signal is generated on the basis of a difference between the amount of the two sub-beams reflected by the recording surface of the disc. Since a control range of the tracking servo system is relatively narrow, it is typical to provide a slider servo system for driving a slider carrying the pickup in a direction of disc radius by means of a low-frequency component of the tracking error signal.

Furthermore, the spindle servo system is structured such that the disc is rotated in accordance with a phase difference between a synchronizing signal included in the read-out signal and a reference signal.

As described above, the tracking servo system, the slider servo system, and the spindle servo system are structured to generate an error signal by irradiating a light onto the recording track which is made up of depressions called "pits" formed in the recording surface of the disc, and detecting the light from the recording surface of the disc. Therefore, if the information reading light spot traces a portion where no signal is recorded, erroneous control operations may be pursued so that the servo systems become uncontrollable. In the worst case, mechanisms of the disc player at each part can be destroyed. In view of this problem, conventional disc players have been provided with an apparatus for detecting a deviation of the reading position (a state that the reading position is off a proper position) by detecting the presence or absence of a so-called RF (Radio Frequency) signal, i.e. an information read-out signal, and determining that the reading position of the information reading light spot is off the proper position according to a result of such a detection.

Additionally, it is very often that operations of the above-described various servo systems, and the command of operational modes of the player are controlled by a centralized system using a microcomputer. Especially, in order to determine timings at which the information reading point is operated to jump track-to-track spacings, a pulse signal synchronized in phase with the sync signal of the video signal, and a focus lock signal indicating as to whether or not the focus servo system is in a locking condition are supplied to the microcomputer as control input signals.

However, in the case where the deviation of reading position is determined by the detection of presence or absence of the RF signal, it is necessary to provide devices such as a comparator circuit, and to supply a detection output signal to the microcomputer. Therefore, the centralized control cannot be pursued if the microcomputer does not have an input port for such an output signal. Furthermore, there is another drawback that the scale of circuits becomes large.

OBJECT AND SUMMARY OF THE INVENTION

The present invention is based on the recognition of the above-described point, and an object of the present invention is to provide an apparatus for detecting the deviation of the reading position by which a condition that the reading position of the information reading light spot is deviated from the proper position is detected without a necessity of enlarging the scale of circuits in the disc player.

In an apparatus for detecting a deviation of reading position in a disc player according to the present invention, a detection signal of the deviation of reading position is generated if a sync signal to be extracted from the read-out signal is not yielded for a predetermined time period under the presence of a lock detection signal which is produced when the focus servo system is in a locking condition.

DETAILED DESCRIPTION OF A PREFERRED EMBODIMENT

Figure 1:
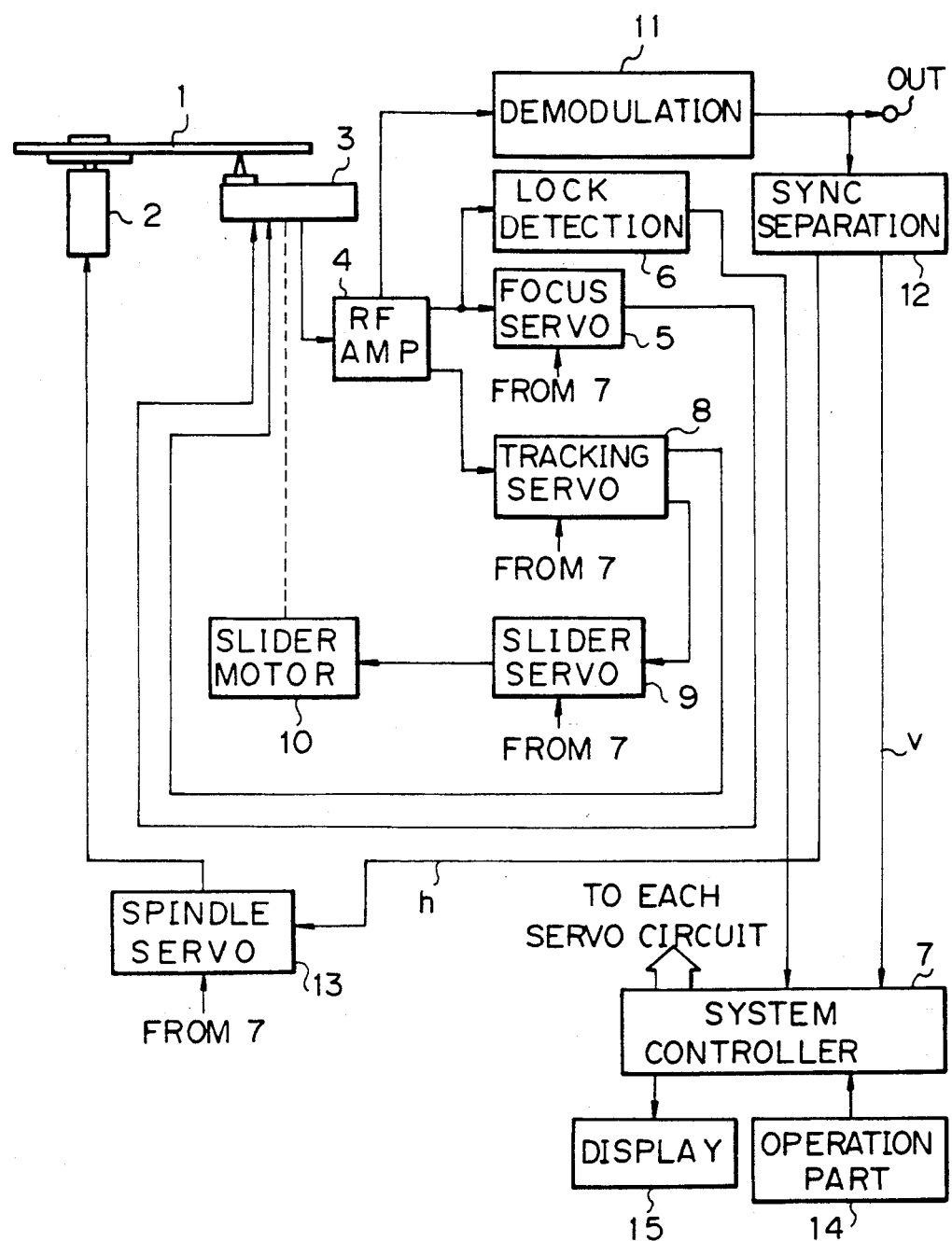
FIG. 1 is a block diagram showing an embodiment of the present invention.

An embodiment of the present invention will be described with reference to the accompanying drawings. As shown in FIG. 1, a disc 1 is rotated by a spindle motor 2. As the disc 1 rotates, the signal recorded on the disc 1 is read out by a pickup 3. The pickup 3 incorporates therein a laser diode, an objective lens, a focus actuator, a tracking actuator, and photo detectors, and so on. Output signals of the photo detectors in the pickup 3 are supplied to an RF amplifier 4. The RF amplifier 4 is configured to amplify the RF signal as the information read-out signal, and also to produce a tracking error signal (e.g. by a three-beam method) and a focus error signal (e.g. by an astigmatic method).

The focus error signal yielded from the RF amplifier 4 is supplied to a focus servo circuit 5 made up of an equalizer amplifier and so on, and to a lock detection circuit 6. The focus servo circuit 5 is configured to generate a drive signal obtained by amplifying the focus error signal and effecting a phase compensation to the amplified signal in response to an "on" command, and to stop the output of the drive signal in response to an "off" command. The output signal of the focus servo circuit 5 is supplied to the focus actuator in the pickup 3. In contrast, the lock detection circuit 6 is configured to produce a focus lock detection signal when the signal level of the focus error signal is less than a predetermined level, indicating that the focus servo system is in a locking condition. An output signal of this lock detection circuit 6 is supplied to a system controller 7.

The tracking error signal yielded from the RF amplifier 4 is supplied to a tracking servo circuit 8. The tracking servo circuit 8 is configured to generate a drive signal obtained by amplifying the tracking error signal and effecting a phase compensation to it in response to an "on" command, and to stop the output of the drive signal in response to an "off" command. The output signal of this tracking servo circuit 8 is supplied to the tracking actuator in the pickup 3. Further, a low frequency component of the tracking error signal is supplied to a slider servo circuit 9. The slider servo circuit 9 is configured to produce a drive signal obtained by amplifying the low frequency component of the tracking error signal and effecting the phase compensation to the amplified signal in response to an "on" command, and to stop the output of the drive signal in response to an "off" command. The output signal of this slider servo circuit 9 is supplied to a slider motor 10 for driving the slider (not shown) carrying the pickup 3 in a direction of the disc radius. By means of the slider servo circuit 9 and the slider motor 10, a control operation is performed so that the tracking actuator in the pickup 3 is positioned at a middle position in its moving range.

The RF signal output from the RF amplifier 4 is supplied to a demodulating circuit 11 which comprises an FM modulator, and so on. A video signal is produced by this demodulating circuit 11, and in turn supplied to a sync (synchronization) separating circuit 12, and to a video output terminal OUT. A horizontal sync signal h separated at the sync separating circuit 12 is supplied to a spindle servo circuit 13. The spindle servo circuit 13 is configured to generate a drive signal corresponding to the phase difference between the horizontal sync signal and a reference horizontal sync signal, to supply the drive signal to the spindle motor 2, and also to stop supplying the drive signal in response to an "off" command. By this spindle servo circuit 13, a control operation is performed by which the speed of rotation of the spindle motor 2 is controlled so that a phase difference between the horizontal sync signal h and the reference horizontal sync signal becomes equal to zero.

Furthermore, a vertical sync signal v separated from the video signal by means of the sync separating circuit 12 is supplied to the system controller 7. The system controller 7 may for example employ a microcomputer comprising a processor, a ROM, a RAM, a timer and so on, which pursues calculating operations on the basis of data or programs stored in the ROM, RAM in response to commands according to key operations supplied from an operation part 14, and supplies instruction signals to various parts. Furthermore, the reference numeral 15 denotes a display device for displaying modes of operation and so on, in response to the commands from the system controller 7.

Figure 2:
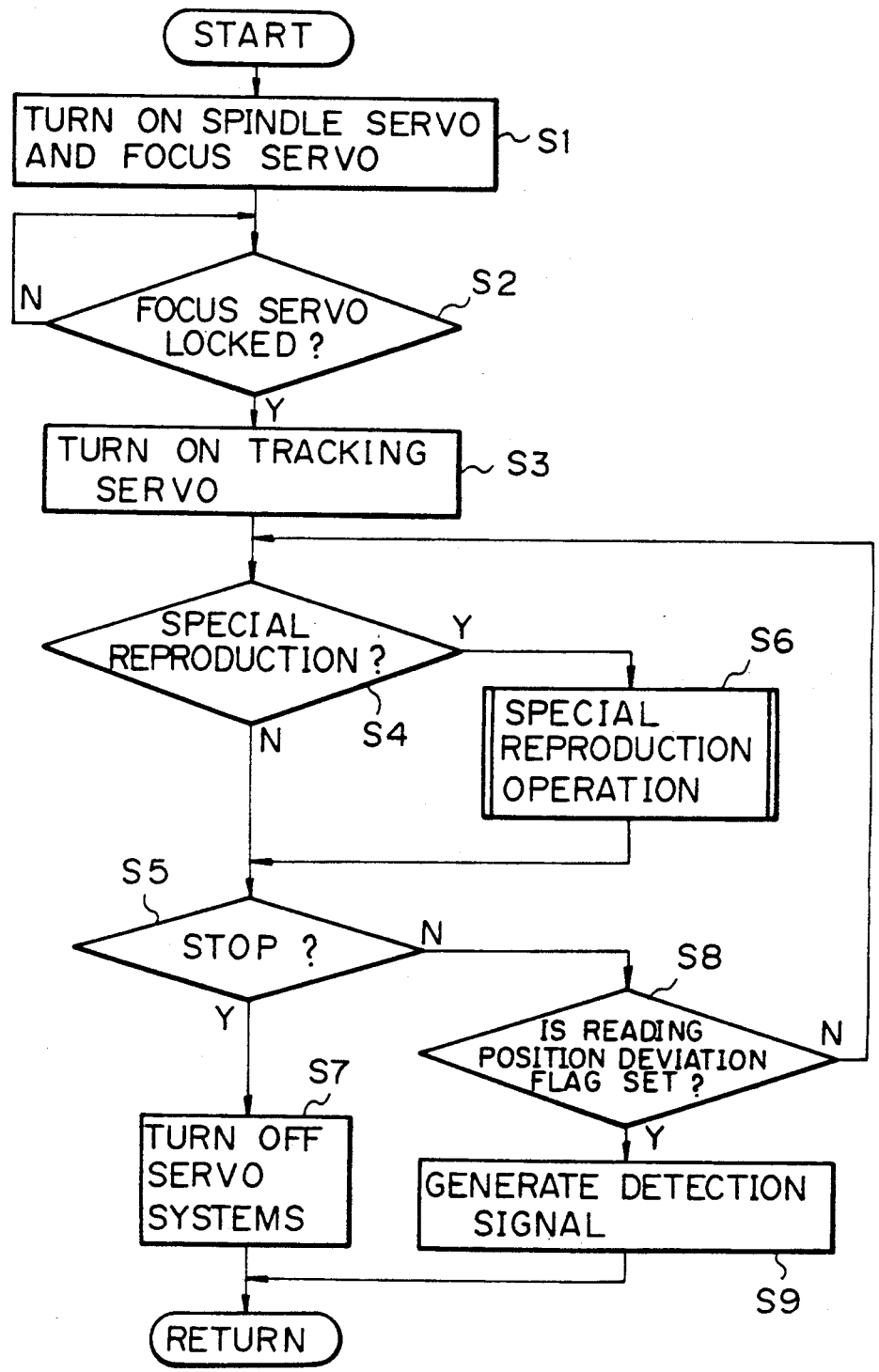
FIGS. 2 and 3 are flowcharts showing the operation of the processor provided in the apparatus shown in FIG. 1.
Figure 3:
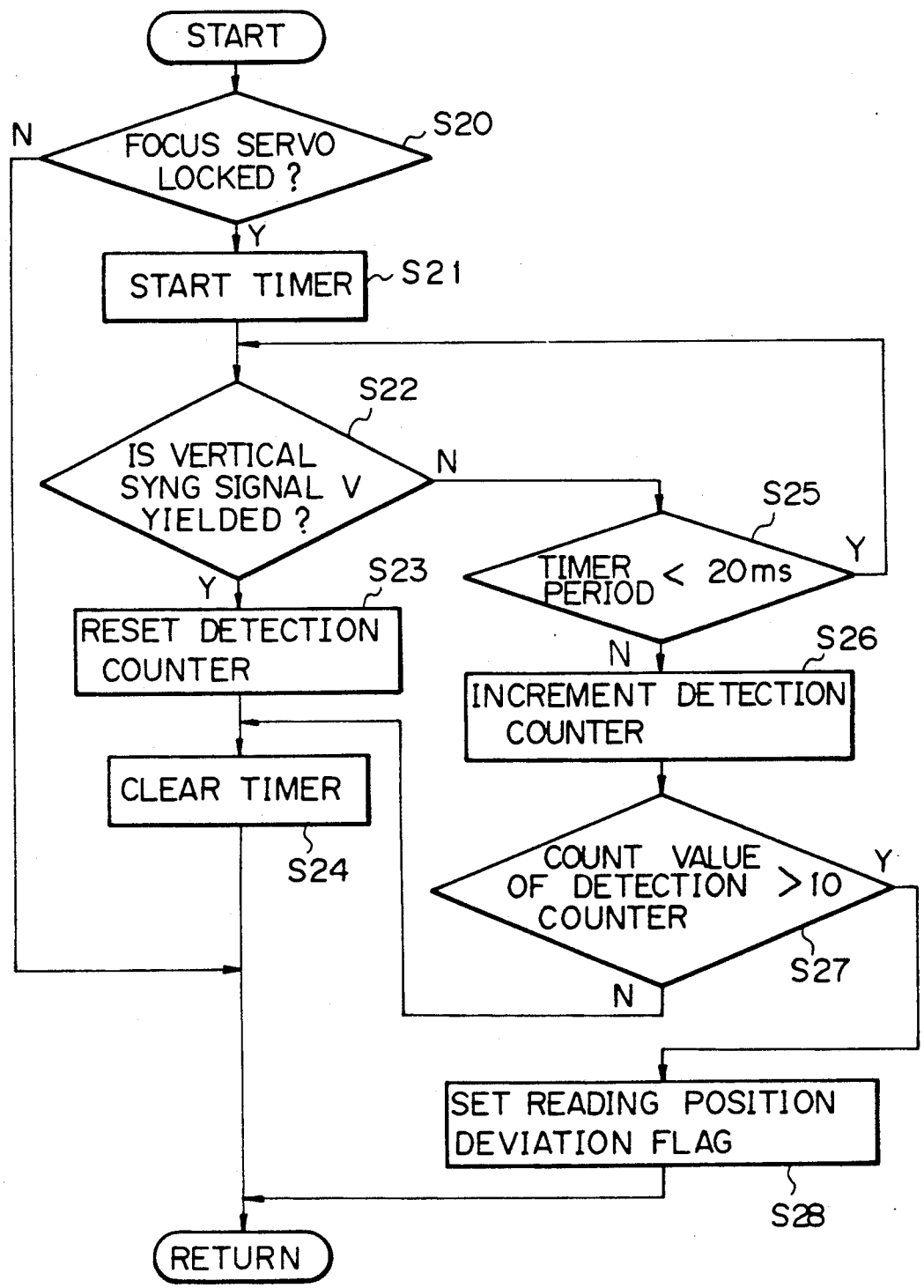

Referring to the flowcharts diagrammed in FIGS. 2 and 3, the operation of the processor in the system controller 7 will be specifically explained.

When a start command is issued during the execution of a main routine and so "on" the processor proceeds to a step S1 to transmit the "on" command to the focus servo circuit 5 and the spindle servo circuit 13. After the execution of step S1, the processor repeats a check to see if the focus servo lock signal has been issued (step S2). Only after it is determined that the focus servo lock signal has been issued will the processor transmit the "on" command to the tracking servo circuit 8 and the slider servo circuit 9 (step S3). Then, the processor moves to step S4 which determines whether or not a special reproduction such as a still picture reproduction is commanded. If it is determined that no special reproduction has been commanded, the processor determines whether a stop command has been issued (step S5). If, on the other hand, it is determined in step S4 that a special reproduction has been commanded, the processor accesses a subroutine for the designated special reproduction operation (step S6), then moves to step S5.

If it is detected in step S5 that a stop command has been issued, the processor transmits the "off" command to the focus servo circuit 5, the tracking servo circuit 8, the slider servo circuit 9, and the spindle servo circuit 13 (step S7), and returns to the routine which was operating immediately before step S1.

If on the other hand, it is determined that the stop command has not been issued, then the processor determines whether or not a reading position deviation flag has been set by a routine which will be described later (step S8). If it is judged in step S8 that the reading position deviation flag has been set, the processor supplies, as a detection signal of the deviation of reading position, the "off" command to the focus servo circuit 5, the tracking servo circuit 8, the slider servo circuit 9, and the spindle servo circuit 13 (step S9). At the same time the processor supplies, to the display device 15, a display command indicating that the reading position has been deviated, as the detection signal of the deviation of reading position (step S9). If it is judged in step S8 that the reading position deviation flag has not been issued, the processor moves to step S4.

Further, if a still picture reproduction has been designated in step S6, the processor issues a command for generating a one-track jump operation in a direction opposite to the direction of reading every time two pulses of the vertical sync signal v are issued from the sync separating circuit 12. Moreover, if a reproduction at double speed has been designated, the processor issues a command for generating a jump operation for jumping track-to-track spacings whose number corresponds to a designated speed in the direction of reading every time the vertical sync signal is generated.

While the routine shown in FIG. 2 is running, the processor moves to a step S20 by an interruption of the timer for example, to judge whether or not the focus lock detection signal has been issued. If it is detected in step S20 that the focus lock detection signal has not been issued, the processor immediately returns to the routine which was operating immediately before step S20. If it is detected in step S20 that the focus lock detection signal has been issued, the processor starts the operation of a timer for monitoring the elapsed time (step S21), and judges as to whether or not the vertical sync signal has been issued from the sync separating circuit 12 (step S22). If it is detected, in step S22, that the vertical sync signal v has been issued, the processor clears the contents (sets the contents to 0) of a predetermined address of the RAM used as a detection counter (step S23), sets the timed data of an elapsed time monitor (i.e. timer) to 0 (step S24), and returns to the routine which was operating immediately before step S20.

If it is detected in step S22 that the vertical sync signal has not been issued, the processor determines whether the period timed by the timer is less than 20 millisecond (step S25). If it is determined in step S25 that the period timed by the timer is less than 20 millisecond, the processor again moves to step S22. If, on the other hand, the period timed by the timer is not less than 20 millisecond, the processor makes the detection counter count upwards by adding a 1 to the contents in the predetermined address of the RAM used as the detection counter (step S26). After pursuing step S26, the processor makes a check to see if the count value of the detection counter has become greater than 10 (step S27). If it is judged in step S27 that the count value of the detection counter has not reached 10, the processor moves to step S24. If, on the other hand, if it is judged in step S27 that the count value of the detection counter has become greater than 10, the processor sets the reading position deviation flag (step S28), and returns to the routine which had been executed immediately before moving to step S20.

The player is activated and the playback operation of the player is started by steps S1 through S3 of the operational sequence described above. Subsequently, if the special reproduction is commanded, a designated special reproduction operation is pursued by steps S4 and S6. On the other hand, if the stop command is issued, the "off" command is supplied to the focus servo circuit 5, tracking servo circuit 8, the slider servo circuit 9, and to the spindle servo circuit 13, through steps S5 and S7, and the playback operation or the special reproduction operation will be stopped. Further, when the reading position deviation flag has been set, the deviation of reading position detection signal is issued through steps S8 and S9, and the off command is supplied to the focus servo circuit 5, the tracking servo circuit 8, the slider servo circuit 9, and the spindle servo circuit 13, so that each servo system is turned "off" and the occurrence of the deviation of reading position is displayed.

Moreover, in the event that the information reading point of the pickup 3 traces a position on which no signal is recorded, during the playback operation or the special reproduction operation, the video signal will not be demodulated although the focus servo system will be kept in a locked state. The vertical sync signal v is not issued from the sync separating circuit under such a condition. Therefore, since the vertical sync signal v is not yielded for more than 20 millisecond, the detection counter is operated to count up through steps S21, S25, and S26. If such a condition where the vertical sync signal is not yielded for more than 20 millisecond has occurred for more than 11 times, the count value of the detection counter reaches 11. As a result, the reading position deviation flag is set through steps S27 and S28, and the state that the deviation of reading position exists is detected. Under such a condition, each servo system is turned off by the steps S8 and S9 described above, so that losing of the control of each servo system is prevented. Furthermore, if the processor moves to step S20 when the focus servo lock detection signal is not issued, as in the initiation of the system operation, the reading position deviation flag cannot be set erroneously because, under such a condition, the processor returns to the routine which had been pursued immediately before moving to step S20.

The present invention has been described by way of example of a video disc player. However, it will be appreciated that the present invention is applicable to other types of disc player such as a digital audio disk player.

As specifically described in the foregoing, in the apparatus for detecting the deviation of reading position according to the present invention, a deviation of reading position detection signal is produced if a sync signal to be extracted from a read-out signal is not issued for a predetermined time period under the presence of a lock detection signal obtained when the focus servo system is in a locking condition. As will be appreciated from the foregoing description, in the apparatus for detecting the deviation of reading position according to the present invention, the judging operation is effected by using a signal which is essential to the servo control of the disc player. Therefore, it is not necessary to separately provide a circuit solely used for detecting the deviation of the reading position. Thus, the deviation of the information reading position of the pickup is detected without enlarging the scale of the circuits in the disc player.

What is claimed is:

1. An apparatus for detecting a deviation of reading position for use in a disc player having a focus servo system for converging an irradiation light on a main surface of a recording disc to form an information reading light spot, and a pickup for generating a read-out signal from said irradiation light from said recording disc, said apparatus comprising:
    a lock detecting means for generating a lock detecting signal when said focus servo system is in a locking condition;
    a sync signal extracting means for extracting a sync signal from an output signal of said pickup; and
    a detecting signal generating means for generating a deviation detection signal indicating a deviation of a reading position of said pickup if said sync signal is not outputted for more than a predetermined time period during the generation of said lock detection signal.

2. An apparatus as claimed in claim 1, wherein said detection signal generating means undergoes a determination whether said reading position of said pickup has deviated from a proper position when said sync signal is not outputted for more than said predetermined time period during the generation of said lock detection signal, and stores a result of said determination as a deviation detection flag.

3. An apparatus as claimed in claim 2, wherein said detection signal generating means generates said deviation detection signal if said deviation detection flag is present when said disc player is pursuing a reproduction operation other than a predesignated reproduction operation.

* * * * *